United States Patent
Lee et al.

(10) Patent No.: US 10,694,013 B2
(45) Date of Patent: Jun. 23, 2020

(54) ELECTRONIC DEVICE WITH WATERPROOF STRUCTURE

(71) Applicant: Samsung Electronics Co., Ltd., Gyeonggi-do (KR)

(72) Inventors: Sung Young Lee, Gyeonggi-do (KR); Myung Hyo Bae, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 16/205,982

(22) Filed: Nov. 30, 2018

(65) Prior Publication Data

US 2019/0173988 A1 Jun. 6, 2019

(30) Foreign Application Priority Data

Dec. 4, 2017 (KR) .......................... 10-2017-0165213

(51) Int. Cl.
  *H04M 1/18* (2006.01)
  *H04B 1/3827* (2015.01)
  *H04B 1/3888* (2015.01)
  *H04B 1/38* (2015.01)

(52) U.S. Cl.
  CPC ............ *H04M 1/18* (2013.01); *H04B 1/3833* (2013.01); *H04B 1/3888* (2013.01); *H04B 2001/3894* (2013.01); *H04M 2250/12* (2013.01)

(58) Field of Classification Search
  CPC ....................................................... H04M 1/18
  USPC ..................................................... 455/575.1
  See application file for complete search history.

(56) References Cited

U.S. PATENT DOCUMENTS

| 9,129,757 | B2 | 9/2015 | Kanbayashi et al. |
| 2013/0077215 | A1 | 3/2013 | Tada et al. |
| 2013/0176666 | A1 | 7/2013 | Yamanaka et al. |
| 2015/0245514 | A1 | 8/2015 | Choung et al. |
| 2016/0131505 | A1 | 5/2016 | Rao et al. |

FOREIGN PATENT DOCUMENTS

| JP | 2013-70271 A | 4/2013 |
| JP | 2013-142985 A | 7/2013 |
| JP | 2013-235802 A | 11/2013 |
| JP | 2015-215683 A | 12/2015 |
| KR | 10-2013-0051081 A | 5/2013 |
| KR | 10-2015-0021205 A | 3/2015 |
| KR | 10-2015-0099295 A | 8/2015 |

OTHER PUBLICATIONS

International Search Report dated Mar. 15, 2019.

*Primary Examiner* — Joel Ajayi
(74) *Attorney, Agent, or Firm* — Cha & Reiter, LLC.

(57) ABSTRACT

The present disclosure provides a waterproof structure of an electronic device with a fingerprint recognition sensor module. The electronic device may include: a housing including a first cover facing a first direction, a second cover facing a second direction opposite the first direction, and a lateral member facing a third direction perpendicular to the first and second directions and disposed to surround at least part of a space between the first and second covers; a sensor module disposed between the first and second covers and mounted to be exposed through at least part of the second cover, the sensor module including a first structure; and a sealing member disposed between the second cover and the first structure and compressed due to assembly of the second cover to prevent moisture from penetrating into the electronic device.

10 Claims, 11 Drawing Sheets

ELECTRONIC DEVICE WITH WATERPROOF STRUCTURE

CROSS REFERENCE TO RELATED APPLICATION(S)

This application is based on and claims priority under 35 U.S.C. § 119 to Korean Patent Application No. 10-2017-0165213, filed on Dec. 4, 2017, in the Korean Intellectual Property Office, the disclosure of which is incorporated by reference herein in its entirety.

BACKGROUND

Field

Various embodiments of the present disclosure generally relate to a waterproof structure of an electronic device having a fingerprint recognition sensor module.

Description of Related Art

In general, there is a risk for portable electronic devices such as smartphones to come into contact with water, for example, due to accidental drops. In such cases, penetration of foreign matter such as water or the like may occur. Therefore, waterproof structures may be provided in the electronic devices to protect electronic components or the like mounted therein from moisture.

The above information is presented as background information only to assist with an understanding of the present disclosure. No determination has been made, and no assertion is made, as to whether any of the above might be applicable as prior art with regard to the present disclosure.

SUMMARY

But electronic devices with a waterproof structure may be structurally complicated and thus difficult to manufacture. Accordingly, defect rate during the manufacturing process may be high to some extent in comparison with electronic devices that do not have the waterproof structure. Analyzing and re-assembling the defective product may be necessary to reduce the defect rate.

Therefore, it is advantageous for the waterproof structure of the electronic device to be easy to dissemble and re-assemble. However, the ease of assembling and re-assembling may depend on the characteristics of the waterproof structure. For example, if the waterproof structure is constructed of tape-type materials, there may have the disadvantage of being difficult to be re-assembled.

In particular, when a fingerprint recognition sensor is installed in the electronic device, the re-assembly of the electronic device may be significantly difficult since the waterproof structure around the fingerprint recognition sensor is constructed of several layers of tape.

The present disclosure, in certain embodiments, proposes a waterproof structure of a sensor module in an electronic device that is easily re-assembled or re-worked.

An electronic device according to certain embodiments of the present disclosure may include: a housing including a first cover facing a first direction, a second cover facing a second direction opposite the first direction, and a lateral member facing a third direction perpendicular to the first and second directions and disposed to surround at least part of a space between the first and second covers; a sensor module disposed between the first and second covers and mounted to be exposed through at least part of the second cover, the sensor module including a first structure; and a sealing member disposed between the second cover and the first structure and compressed due to assembly of the second cover to prevent moisture from penetrating into the electronic device.

An electronic device according to certain embodiments of the present disclosure may include: a rear cover; a rear case bonded to the rear cover; a fingerprint recognition sensor module disposed between the rear cover and the rear case and mounted to be exposed through at least a portion of the rear cover to enable an optical operation of the fingerprint recognition sensor; a decorating member which surrounds at least part of the fingerprint recognition sensor module, where at least part of the decorating member is exposed to an exterior of the electronic device; and a waterproof structure disposed between the rear cover and the decorating member. The waterproof structure may include: a first structure extending horizontally from a part of the decorating member, where the first structure and the part of the decorating member are integrally molded; and a sealing member attached on the first structure, disposed to be compressed between the rear cover and the first structure when the rear cover and the rear case are bonded, and having a sealing portion that provides a plurality of sealing points.

A waterproof structure of a fingerprint recognition sensor module according to one or more embodiments of the present disclosure can be more easily dissembled and re-assembled than those waterproof structures in the conventional art. Because re-assembly is made easier, the present disclosure can improve assemblability, reduce defect rate, and contribute to decreasing the manufacturing cost.

In addition, one or more embodiments of the present disclosure can omit a structure for mounting the fingerprint recognition sensor module because the flexible circuit board of the fingerprint recognition sensor module can be bonded to a portion of the waterproof structure.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
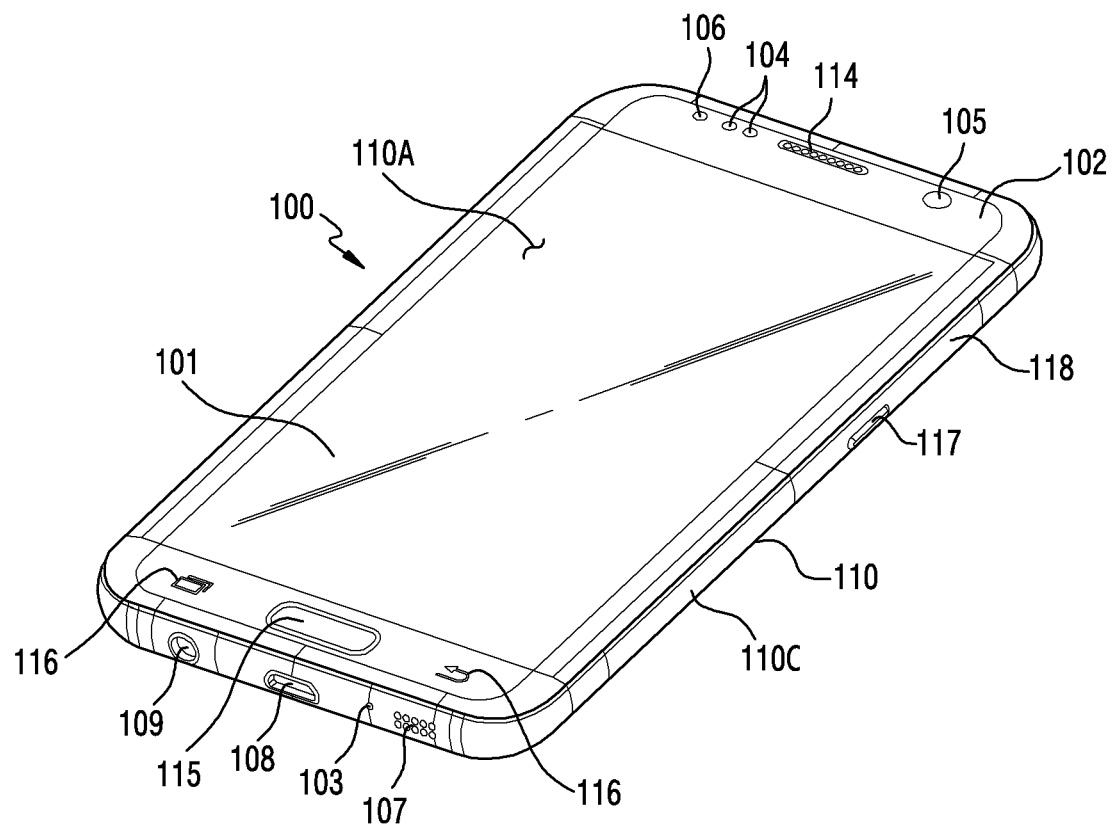
FIG. 1 is a front perspective view illustrating a mobile electronic device according to an embodiment.

Hereinafter, certain embodiments of the present disclosure are described with reference to the accompanying drawings. It should be appreciated, however, it is not intended to limit the embodiments of the present disclosure to the particular form disclosed, but, on the contrary, it is intended to cover all modifications, equivalents, and alternatives falling within the spirit and scope of the embodiments of the present disclosure. Like reference numerals denote like constitutional elements throughout the drawings.

An electronic device according to certain embodiments of the present disclosure may be at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), a MPEG-1 Audio Layer 3 (MP3) player, a mobile medical device, a camera, and a wearable device (e.g., smart glasses, a Head-Mounted Display (HMD), an electronic costume, an electronic bracelet, an electronic necklace, an electronic appcessory, an electronic tattoo, a smart mirror, and a smart watch).

Figure 2:
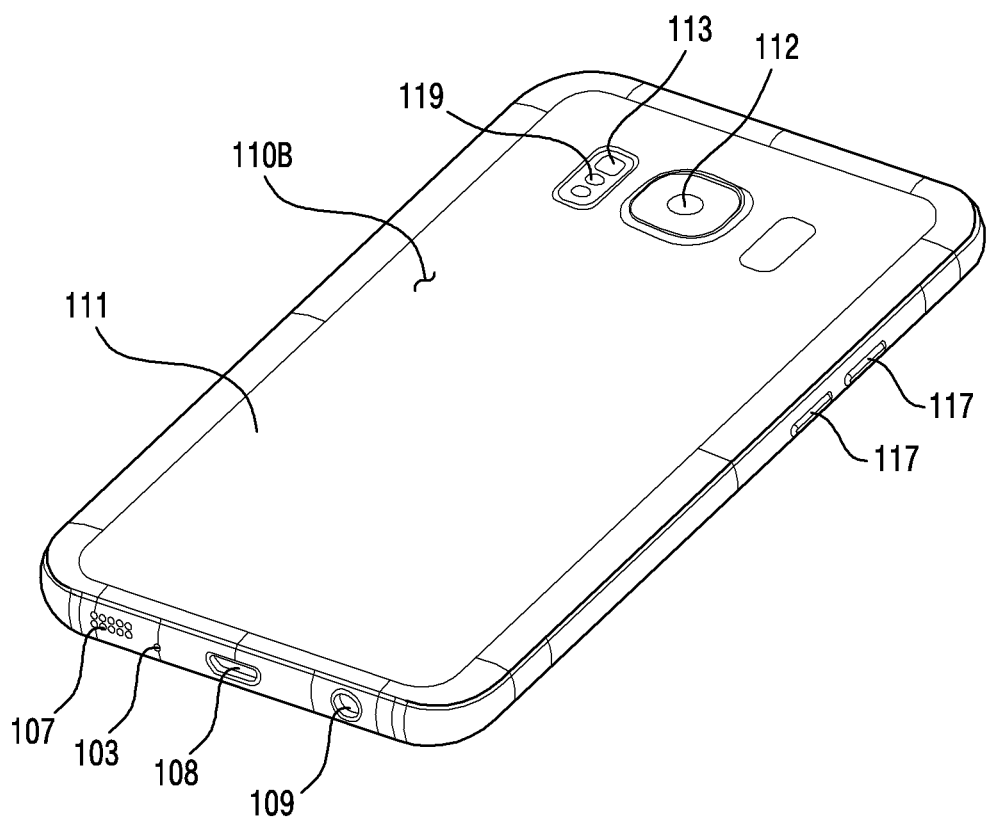
FIG. 2 is a rear perspective view illustrating the mobile electronic device of FIG. 1.

FIG. 1 is a front perspective view illustrating a mobile electronic device according to an embodiment. FIG. 2 is a rear perspective view illustrating the mobile electronic device of FIG. 1.

Referring to FIG. 1 and FIG. 2, an electronic device 100 according to an embodiment may include a housing 110 which includes a first side (or a front side) 110A, a second side (or a rear side) 110B, and a lateral side 110C surrounding a space between the first side 100A and the second side 110B. In another embodiment (not shown), the housing may refer to a structure which constitutes parts of the first side 110A, second side 110B, and third side 110C of FIG. 1. According to an embodiment, the first side 110A may be made of a front plate 102 (e.g., a polymer plate or a glass plate having various coating layers) which is at least partially transparent. The second side 110B may be constructed of a rear plate 111 which is opaque. For example, the rear plate 111 may be made of coated or colored glass, ceramic, polymer, metallic materials (e.g. aluminum, stainless steel (STS), or magnesium) or a combination of at least two of the these materials. The lateral side 110C may be a lateral bezel structure (or a lateral member) 118 bonded to the front plate 102 and the rear plate 111 and be made of metal and/or polymer. In some embodiments, the rear plate 111 and the lateral bezel structure 118 may be integrated and may be made of the same material (e.g., metallic material such as aluminum).

According to an embodiment, the electronic device 100 may include at least one or more of a display 101, audio modules 103, 107, and 114, sensor modules 104, 119, camera modules 105, 112, and 113, key input devices 116 and 117, an indicator 106, and connector holes 108 and 109. In some embodiments, the electronic device 100 may omit at least one (e.g., the key input devices 116 and 117 or the indicator 106) of these components, or may additionally include other components.

The display 101 may be exposed through, for example, the portion of the front plate 102 that is transparent. The display 101 may further be disposed adjacent to or bonded to a touch sensing circuit, a pressure sensor capable of measuring touch strength (pressure), and/or a digitizer for detecting a stylus pen, where the stylus pen may generate a magnetic field.

The audio modules 103, 107, and 114 may include the microphone hole 103 and the speaker holes 107 and 114. The microphone hole 103 may have a microphone disposed inside thereof so that it can acquire external sound, and in some embodiments, may have a plurality of microphones disposed to detect the direction of the sound. The speaker holes 107 and 114 may include the external speaker hole 107 and the communication receiver hole 114. In some embodiments, the speaker holes 107 and 114 and the microphone hole 103 may be implemented as a single hole, or a speaker may be included in the electronic device without the speaker holes 107 and 114, for example when the speaker is a Piezo speaker.

The sensor modules 104 and 119 may generate electrical signals or data values corresponding to internal operating states of the electronic device 100 or various aspects of the external environment of the electronic device 100. The sensor modules 104 and 119 may include, for example, the first sensor module 104 (e.g., a proximity sensor) and/or second sensor module (e.g., a fingerprint sensor, not shown) disposed on the first side 110A of the housing 110, and/or the third sensor module 119 (e.g., a heart-rate monitor (HRM) sensor) disposed on the second side 110B of the housing 110. The fingerprint sensor may be disposed not only on the first side 110A (e.g., on the home key button 115) of the housing 110 but also on the second side 110B. The electronic device 100 may further include at least one of other sensor modules that are not shown, such as a gesture sensor, a gyro sensor, an atmospheric pressure sensor, a magnetic sensor, an acceleration sensor, a grip sensor, a color sensor, an Infrared (IR) sensor, a biometric sensor, a temperature sensor, a humidity sensor, and an illumination sensor 104.

The camera modules 105, 112, and 113 may include the first camera device 105 disposed on the first side 110A of the electronic device 100, the second camera device 112 disposed on the second side 110B, and/or the flash 113. The camera module 105 and 112 may include one or more lenses, an image sensor, and/or an image signal processor. The flash 113 may include, for example, a Light Emitting Diode (LED) or a xenon lamp. In some embodiments, two or more lenses (wide angle and telephoto lenses) and image sensors may be disposed on one side of the electronic device 100.

The key input devices 115, 116, and 117 may include the home key button 115 disposed on the first side 110A of the housing 110, the touch pad 116 disposed around the home key button 115, and/or the side key button 117 disposed on the lateral side 110C of the housing 110. In another embodiment, the electronic device 100 may not include some or all of the aforementioned key input devices 115, 116, and 117. In such cases, any of the key input devices 115, 116, and 117 that are not included may be implemented on the display 101 as software keys or the like.

The indicator 106 may be disposed on, for example, the first side 110A of the housing 110. The indicator 106 may optically provide, for example, information regarding a state of the electronic device 100, and may include an LED.

The connector holes 108 and 109 may include the first connector hole 108 capable of accommodating a connector (e.g., a USB connector) for transmitting/receiving power and/or data to or from an external electronic device and/or the second connector hole (e.g., earphone jack) 109 capable of accommodating a connector for transmitting/receiving an audio signal to or from another external electronic device.

Figure 3:
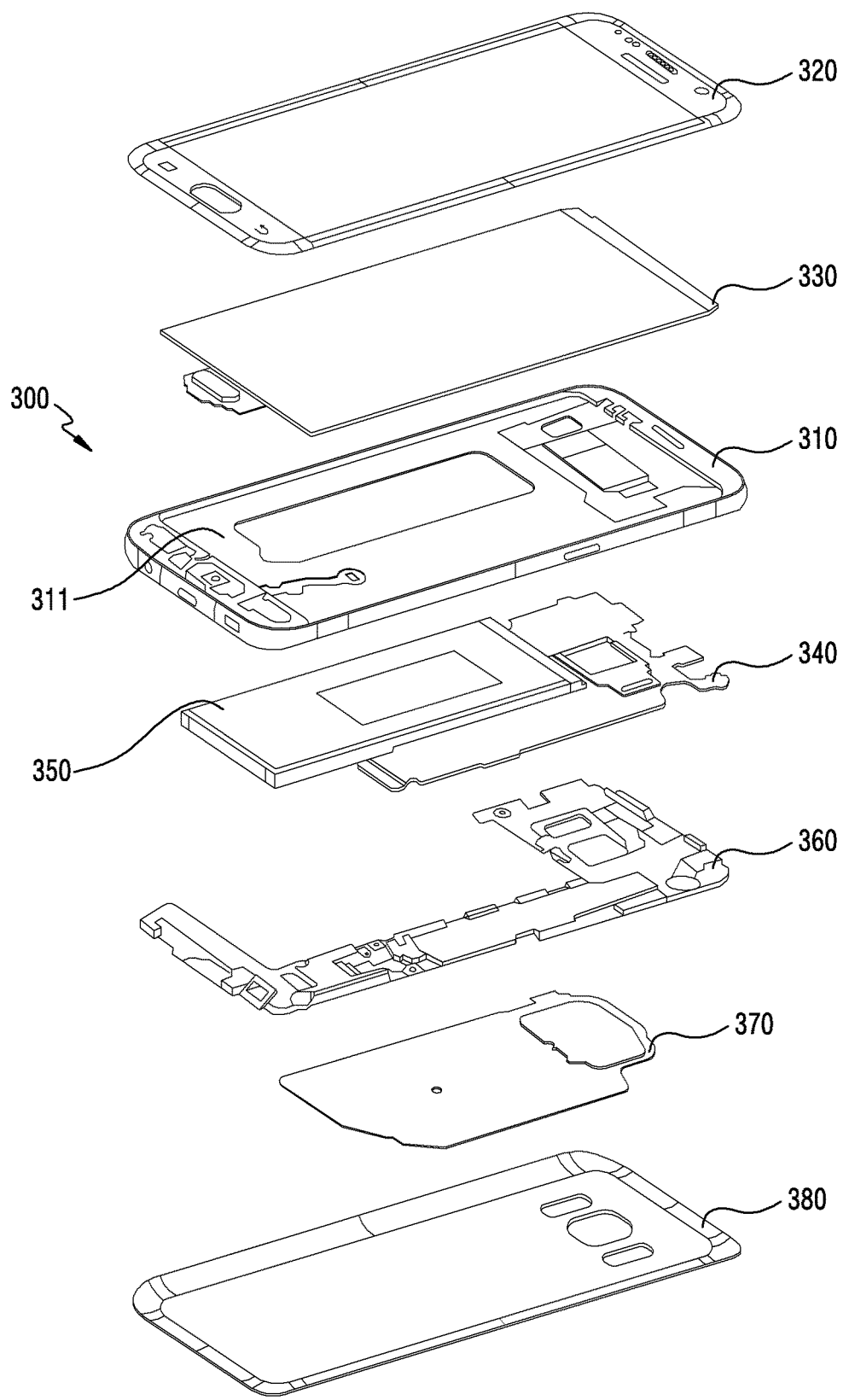
FIG. 3 is an exploded perspective view illustrating an inner structure of the mobile electronic device of FIG. 1.

FIG. 3 is an exploded perspective view illustrating an inner structure of the mobile electronic device of FIG. 1.

Referring to FIG. 3, an electronic device 300 may include a lateral bezel structure 310, a first support member 311 (e.g., a bracket), a front plate 320, a display 330, a printed circuit board 340, a battery 350, a second support member 360 (e.g., a rear case), an antenna 370, and a rear plate 380. In some embodiments, the electronic device 300 may omit at least one (e.g., the first support member 311) of these components, or may additionally include other components. Some of the components of the electronic device 300 may be the same as or similar to some of the components of the electronic device 100 of FIG. 1 or FIG. 2, and redundant descriptions will be omitted hereinafter.

The first support member 311 may be coupled with the lateral bezel structure 310 and be disposed inside the electronic device 300, or may be integrated to the lateral bezel structure 310. The first support member 311 may be made of, for example, a metal material and/or non-metallic material (e.g., polymer). The display 330 may be bonded to one side of the first support member 311, and the printed circuit board 340 may be bonded to the other side thereof. A processor, a memory, and/or an interface may be mounted on the printed circuit board 340. The processor may include, for example, one or more of a central processing unit, an application processor, a graphic processing unit, an image signal processor, a sensor hub processor, and a communication processor.

The memory may include, for example, a volatile memory or a non-volatile memory.

The interface may include, for example, a High Definition Multimedia Interface (HDMI), a Universal Serial Bus (USB) interface, a Secure Digital (SD) card interface, and/or an audio interface. For example, the interface may electrically or physically couple the electronic device 300 and the external electronic device, and may include a USB connector, an SD card/MMC connector, or an audio connector.

As a device for supplying power to at least one component of the electronic device 300, the battery 350 may include, for example, a non-rechargeable primary cell, a rechargeable secondary cell, or a fuel cell. At least one portion of the battery 350 may be disposed on substantially the same plane as the printed circuit board 340. The battery 350 may be disposed integrally inside the electronic device 100, or may be detachably disposed with respect to the electronic device 300.

The antenna 370 may be disposed between the rear plate 380 and the battery 350. The antenna 370 may include, for example, a Near Field Communication (NFC) antenna, a wireless charging antenna, and/or a Magnetic Secure Transmission (MST) antenna. The antenna 370 may perform short-range communication, for example, with an external electronic device, or may wirelessly transmit/receive power required for charging. In another embodiment, the antenna structure may be implemented using at least part of the lateral bezel structure 310 and/or the first support member 311 or a combination thereof.

Hereinafter, a waterproof structure of a sensor module according to one or more embodiments of the present disclosure will be described in detail with reference to the accompanying drawings.

Figure 4:
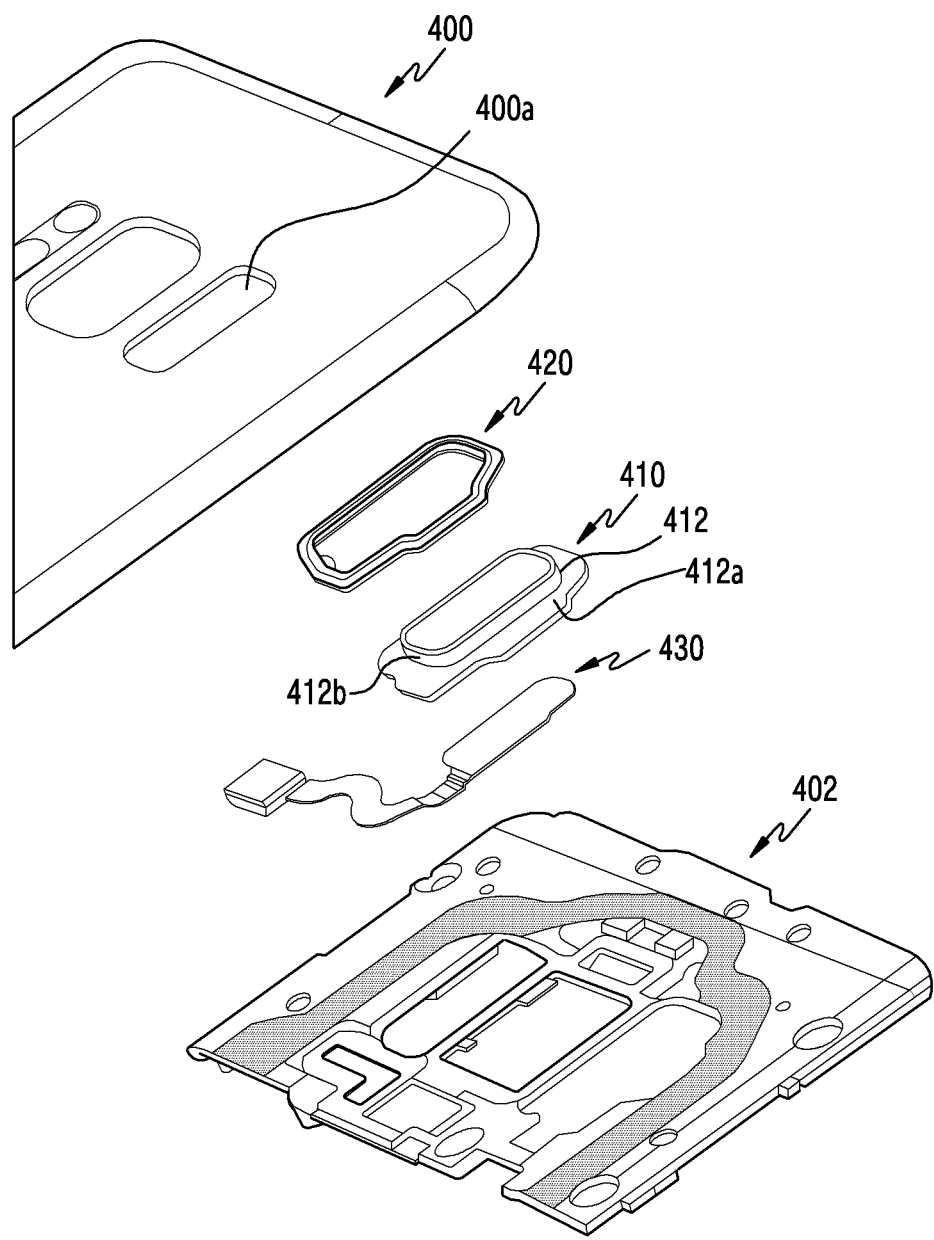
FIG. 4 is an exploded perspective view illustrating a waterproof structure of a sensor module mounted to a rear cover of a mobile electronic device according to an embodiment of the present disclosure.
Figure 5:
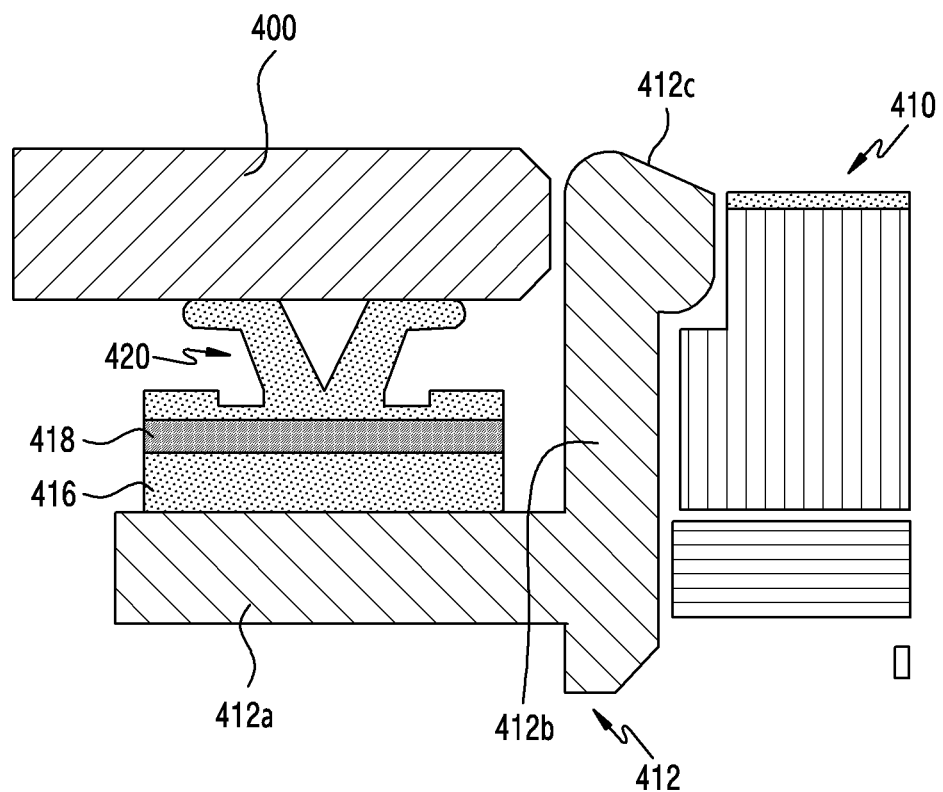
FIG. 5 is a cross-sectional view illustrating a configuration of one side of a waterproof structure according to an embodiment of the present disclosure.
Figure 6:
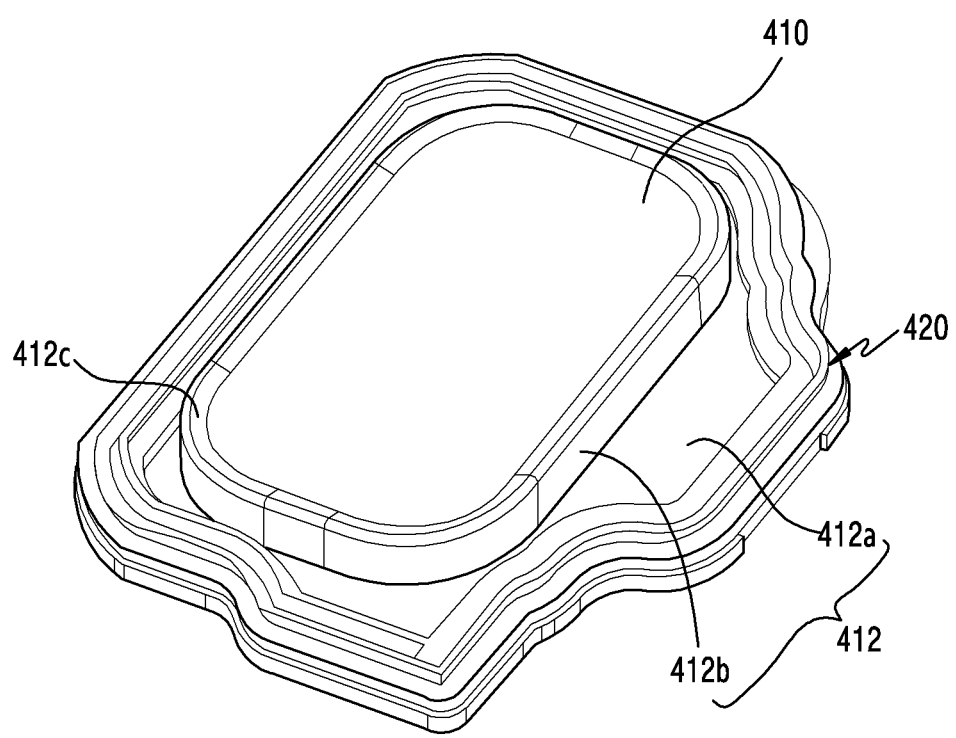
FIG. 6 is a perspective view illustrating a waterproof structure of a sensor module mounted to a rear cover of a mobile electronic device according to an embodiment of the present disclosure.

FIG. 4 is an exploded perspective view illustrating a waterproof structure of a sensor module mounted to a rear cover of a mobile electronic device according to an embodiment of the present disclosure. FIG. 5 is a cross-sectional view illustrating a configuration of one side of a waterproof structure according to an embodiment of the present disclosure. FIG. 6 is a perspective view illustrating a waterproof structure of a sensor module mounted to a rear cover of a mobile electronic device according to an embodiment of the present disclosure.

Referring to FIG. 4 to FIG. 6, an electronic device according to one embodiment may be an electronic device which is at least partially the same as the electronic devices 100 and 300 of FIG. 1 to FIG. 3. The electronic device according to one embodiment may include a waterproof structure of a sensor module 410 that is exposed by a rear cover 400. The waterproof structure may be a structure capable of preventing foreign matter, e.g., water, from penetrating into the electronic device through a gap between an opening 400a and the sensor module 410.

The waterproof structure according to an embodiment may include a first structure 412a, which is at least part of the sensor module 410, and a sealing member 420.

The sensor module 410 according to an embodiment may be disposed to be at least partially exposed through the opening 400a of the rear cover 400. The sensor module 410 may perform an optical operation, such as optical fingerprint recognition, i.e. recognizing fingerprints based on light reflected from a finger. The exposed portion may include part of a decorating member 412 bonded to the sensor module 410. The sensor module 410 may include, for example, a fingerprint recognition sensor module. In other examples, the sensor module 410 is not necessarily limited to being mounted to the rear cover 400, but instead may be mounted to the lateral member or the front cover of the electronic device.

The first structure 412a extends in a horizontal direction from the sensor module 410 and may be part of the sensor module 410. The decorating member 412 according to an embodiment has a shape which surrounds a lateral side of the sensor module 410, and may include a second structure 412b which extends in a vertical direction from the sensor module 410. The second structure 412b further surrounds the lateral side of the sensor module 410. The first structure 412a and the second structure 412b may be perpendicular to each other. In addition, the decorating member 412 may have a third structure 412c at an upper end of the second structure 412b. As shown in FIG. 5, one face of the third structure 412c may serve as part of the rear surface of the electronic device.

The first structure 412a according to an embodiment may extend in a horizontal direction from a bottom portion of the sensor module 410. For example, the first structure 412a may be a member that supports the sealing member 420. The first structure 412a may be constructed of the same material as the decorating member 412. The first structure 412a may be constructed so that it has a sufficient area extending in the horizontal direction such that the sealing member 420 can be attached. The first structure 412a may be made of metal or synthetic resin or a combination thereof.

The second structure 412b according to an embodiment is a portion which surrounds the lateral perimeter of the sensor module, and a lower end thereof may be integrally coupled with the first structure 412a. The second structure 412b may be made of the same material as the first structure 412a, which for example may be metal, synthetic resin, or a combination thereof. The first structure 412a and the second structure 412b may be integrally molded.

The sealing member 420 according to an embodiment may be disposed between the rear cover 400 and the first structure 412a so that the sealing member 420 is compressed by the rear case 402 and the rear cover 400, thereby preventing moisture from penetrating into the electronic device. For example, the sealing member 420 may be attached and fixed to an upper side of the first structure 412a by means of a waterproof tape 416. The sealing member 420 may be made of an elastic material such as rubber or silicon. In addition, an auxiliary layer 418 with good adhesion characteristics may be disposed between the sealing member 420 and the waterproof tape 416, so that the sealing member 420 can be more firmly fixed to the first structure 412a.

Therefore, the sealing member 420 according to an embodiment may be disposed along the perimeter of the sensor module 410 to enclose the sensor module 410 in a top view of the sensor module 410. In addition, the first structure 412a may also be disposed along the perimeter of the sensor module 410. Due to the sealing member 420, moisture which has penetrated the space between the opening 400a of the rear cover and the third structure 412c of the decorating member can be prevented from further penetrating into the electronic device.

In the assembling process of the waterproof structure according to an embodiment, assembly may be performed in order of attaching the decorating member 412 to the rear case 402 and then bonding the rear cover 400 to the rear case 402. When the rear cover 400 is bonded to the rear case 402, the sealing member 420 may be compressed by the rear cover 400 so as to seal the opening 400a.

Figure 7:
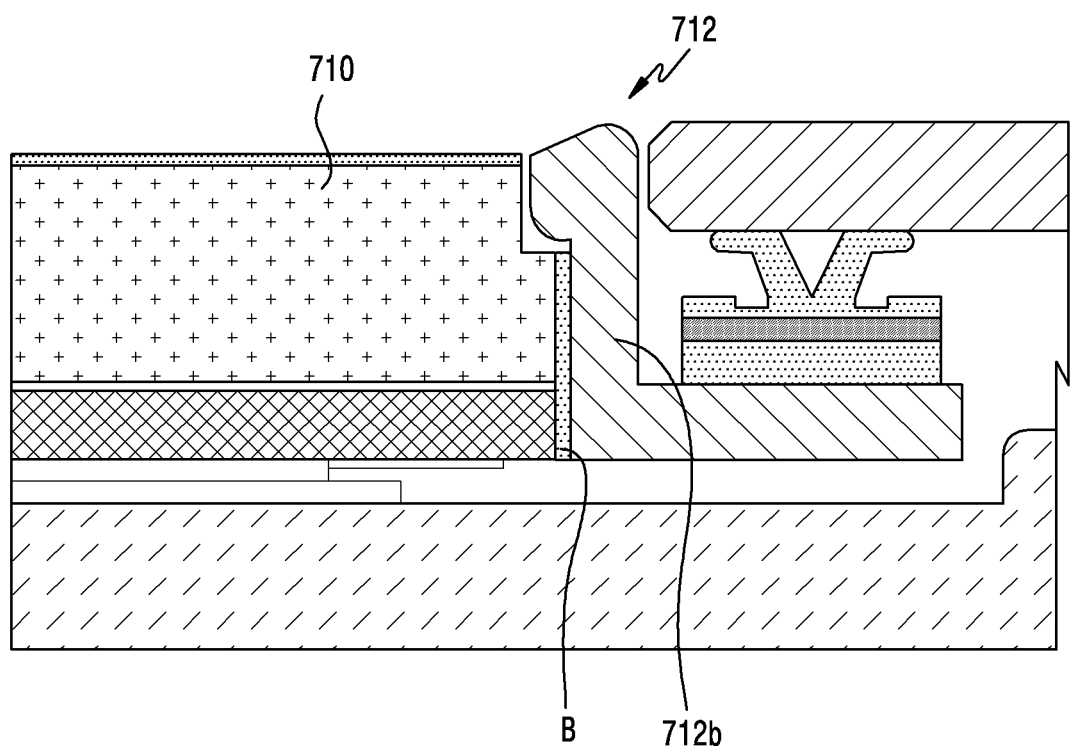
FIG. 7 is a cross-sectional view illustrating a waterproof structure according to an embodiment of the present disclosure.

FIG. 7 is a cross-sectional view illustrating a waterproof structure according to an embodiment of the present disclosure.

Referring to FIG. 7, an electronic device according to an embodiment may be at least partially the same as the electronic device 100 and 300 of FIG. 1 to FIG. 3. In a waterproof structure of a sensor module 710 according to an embodiment, an adhesive B may be added to prevent moisture from penetrating in the gap between the sensor module 710 and a second structure 712b of a decorating member 712. Since the gap between the sensor module 710 and the second structure 712b is blocked by the adhesive B, moisture can be prevented from penetrating into the electronic device via the gap.

Figure 8A:
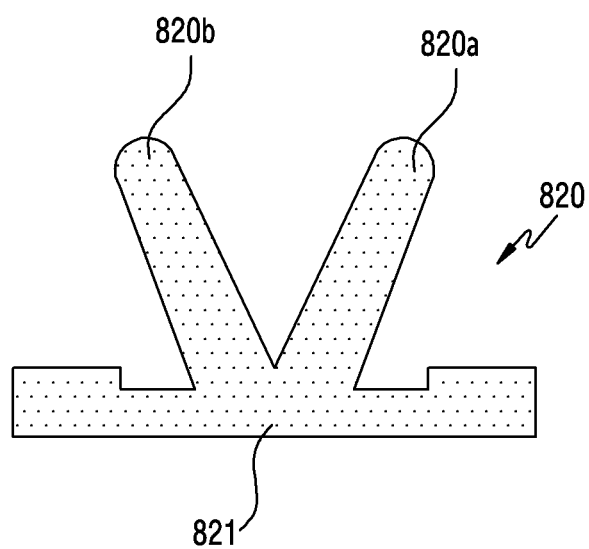
FIG. 8A, FIG. 8B and FIG. 8C are cross-sectional views illustrating certain embodiments of a sealing member applied to a waterproof structure according to the present disclosure.
Figure 8B:
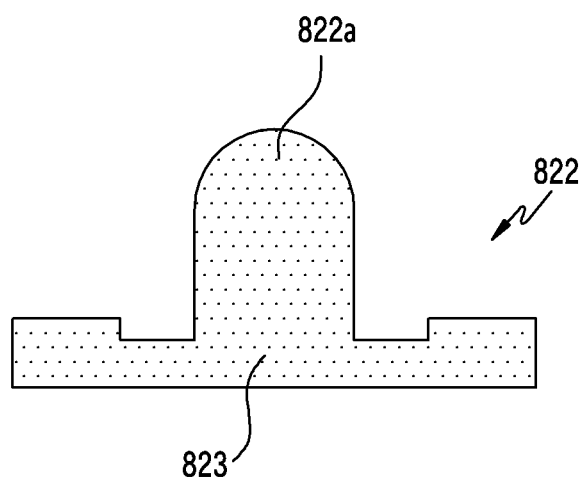
Figure 8C:
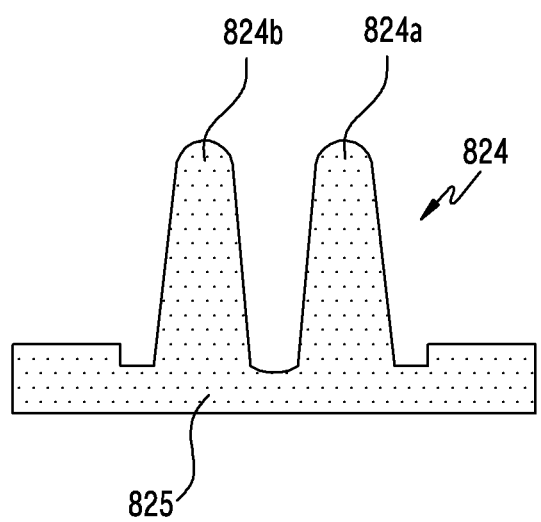

FIG. 8A to FIG. 8C are cross-sectional views illustrating certain embodiments of a sealing member applied to a waterproof structure according to the present disclosure.

Referring to FIG. 8A, a sealing member 820 according to an embodiment may have a structure at least partially the same as the sealing member 420 of FIG. 4 to FIG. 6. The sealing member 820 according to this embodiment may include a body 821 and sealing portions 820a and 820b. The body 821 may be attached to a first structure and at least one or more sealing portions 820a and 820b may extend from the body 821. The body 821 may be a supporting member which is attached on the first structure, and the sealing portions 820a and 820b may be portions which are compressed when the rear case is bonded to the rear cover. When compressed, the sealing portions 820a and 820b may be tightly in contact with some interior portions of the rear cover.

The sealing portion according to this embodiment may include the first sealing portion 820a extending from the body 821 and the second sealing portion 820b extending from the body 821 and diverging from the first sealing portion 820a. For example, a cross-section of the first and second sealing portions 820a and 820b may have a "V" shape. An end portion of each of the first and second sealing portions 820a and 820b may have a curved shape, and may be closely in contact with an interior side of the rear cover to provide sealing at two positions.

Referring to FIG. 8B, a sealing member 822 according to this embodiment may be made of a single sealing portion 822a. A cross-section of the single sealing portion 822a, aside from an end portion thereof, may be substantially rectangular. The single sealing portion 822a may extend in a predetermined direction from a body 823, and the end portion of the single sealing portion 822a may have a curved shape.

Referring to FIG. 8C, a sealing member 824 according to this embodiment may be made of first and second sealing portions 824a and 824b. A cross-section of the first and second sealing portions 824a and 824b may have a pointed shape, for example, a roughly isosceles triangular shape. Each of the first and second sealing portions 824a and 824b may extend from a body 825, and each end portion thereof may have a curved shape.

Figure 9:
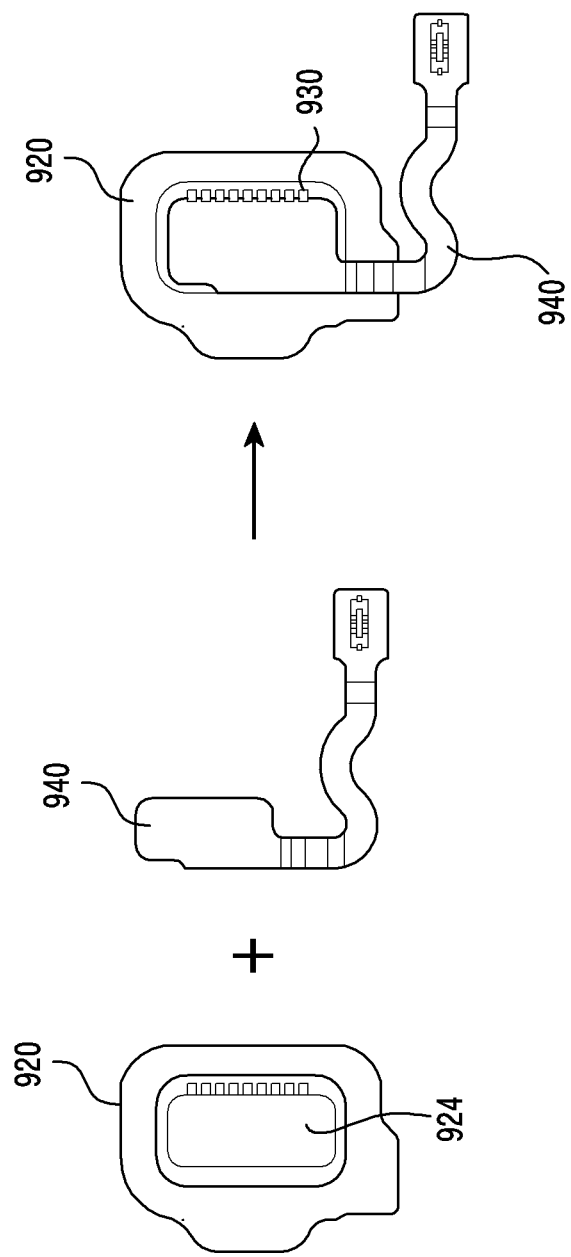
FIG. 9 illustrates a bonding process of a sensor module and a flexible circuit board according to an embodiment of the present disclosure.

FIG. 9 illustrates a bonding process of a sensor module and a flexible circuit board according to an embodiment of the present disclosure.

Referring to FIG. 9, a sensor module 920 according to an embodiment may be electrically coupled to a printed circuit board by means of a flexible circuit board (i.e. a Flexible Printed Circuit Board (FPCB)) 940. For example, the sensor module 920 and the FPCB 940 which are separately manufactured may be combined by a bonding process. The bonding area of the FPCB 940 may be larger than the bonding area of the sensor module 920, such that a portion of the bonding area of the FPCB 940 may be bonded to a decorating member of the sensor module. For example, reference numeral 924 may indicate a bonding surface of the sensor module 920, and reference numeral 930 may indicate a contact portion.

An electronic device according to certain embodiments of the present disclosure may include: the housing including the first cover 102 facing a first direction, the second cover 400 facing a second direction opposite the first direction, and the lateral member 110C facing a third direction perpendicular to the first and second directions and disposed to surround at least part of a space between the first and second covers 102 and 400; the sensor module 410 disposed between the first and second covers 102 and 400 and mounted to be exposed through at least part of the second cover 400, the sensor module 410 including a first structure 412a; and the sealing member 420 disposed between the second cover 400 and the first structure 412a and compressed due to assembly of the second cover 400 to prevent moisture from penetrating into the electronic device.

The sensor module 410 according to certain embodiments of the present disclosure may be exposed through the at least part of the second cover to perform an optical operation.

The sensor module 410 according to certain embodiments of the present disclosure may include a fingerprint recognition sensor module.

The sensor module 410 according to certain embodiments of the present disclosure may further include the decorating member 412 having the third structure 412c whose one face thereof serves as at least part of an exterior surface of the second cover 400.

The decorating member 412 according to certain embodiments of the present disclosure may further include the second structure 412b which surrounds a lateral side of the sensor module 410. The first structure 412a may extend horizontally from the second structure 412b.

The first structure 412a and second structure 412b according to certain embodiments of the present disclosure may be perpendicular to each other and extend along a perimeter of the sensor module.

The sealing member 420 according to certain embodiments of the present disclosure may be disposed to be compressed between an inner side of the second cover 400 and the first structure 412a.

One part of the sealing member 420 according to certain embodiments of the present disclosure may be attached to one side of the first structure 412a by the waterproof tape 416, and another part thereof may be compressed by the second cover 400.

The sealing member 420 according to certain embodiments of the present disclosure may prevent moisture, which has penetrated a space between the second cover 400 and the third structure 412c of the decorating member 412, from further penetrating into the electronic device.

The sealing member 820 according to certain embodiments of the present disclosure may include: the body 821 attached to the first structure 412a; and at least one or more of the sealing portions 820a and 820b which extend from the body 821 and are compressed by the second cover 400.

The sealing portions 820a and 820b according to certain embodiments of the present disclosure may extend to surround a perimeter of the sensor module 410 in a top view of the sensor module 410 to enclose the sensor module 410.

A cross-section of the sealing portions 820a and 820b according to certain embodiments of the present disclosure may have a "V" At least two end portions of the sealing portions 820a and 820b may contact the second cover 400.

Each of the first and second structures 412a and 412b according to certain embodiments of the present disclosure may be made of a metal material, and may be integrally molded.

An adhesive layer B may be further disposed in a space between the sensor module 410 and the second structure 412b of the decorating member 412 to prevent moisture from penetrating into the electronic device through the space between the sensor module 410 and the decorating member 412.

An electronic device according to certain embodiments of the present disclosure may include: the rear cover 400; the rear case 402 bonded to the rear cover 400; the fingerprint recognition sensor module 410 disposed between the rear cover 400 and the rear case 402 and mounted to be exposed through at least a portion of the rear cover 400 to enable an optical operation of the fingerprint recognition sensor 410; the decorating member 412 which surrounds at least part of the fingerprint recognition sensor module 410, where at least part of the decorating member is exposed to an exterior of the electronic device; and a waterproof structure disposed between the rear cover 400 and the decorating member 412. The waterproof structure may include: the first structure 412a extending horizontally from a part of the decorating member, where the first structure 412a and the part of the decorating member are integrally molded; and the sealing member 820 attached on the first structure 412a, disposed to be compressed between the rear cover 400 and the first structure 412a when the rear cover 400 and the rear case 402 are bonded, and having sealing portions 820a and 820b that provide a plurality of sealing points.

The first structure 412a according to certain embodiments of the present disclosure may extend along a perimeter of the fingerprint recognition sensor module 410.

The sealing member 820 according to certain embodiments of the present disclosure may include the body 821 attached on the first structure 412a. The first and second sealing portions 820a and 820b extending from the body 821, compressed by the rear cover 400, and spaced apart from each other.

A cross-section of the first and second sealing portions 820a and 820b according to certain embodiments of the present disclosure may have a "V" shape together.

The first and second sealing portions 820a and 820b according to certain embodiments of the present disclosure may provide two sealing points.

In the disclosure disclosed herein, the expressions "have," "may have," "include," "comprise," "may include," and "may comprise" used herein indicate existence of corresponding features (for example, elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to the other element or an intervening element (for example, a third element) may be present. In contrast, when an element (for example, a first element) is referred to as being "directly coupled with/to" or "directly connected to" another element (for example, a second element), it should be understood that there are no intervening element (for example, a third element).

According to the situation, the expression "configured to" used herein may be used as, for example, the expression "suitable for," "having the capacity to," "designed to," "adapted to," "made to," or "capable of" The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor)

which may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal meaning unless expressly so defined herein in various embodiments of the present disclosure. In some cases, even if terms are terms which are defined in the specification, they may not be interpreted to exclude embodiments of the present disclosure.

Meanwhile, the exemplary embodiments disclosed in the specification and drawings are merely presented to easily describe the technical contents of the present disclosure and help with the understanding of the present disclosure and are not intended to limit the scope of the present disclosure. Therefore, all changes or modifications derived from the technical idea of the present disclosure as well as the embodiments described herein should be interpreted to belong to the scope of the present disclosure.

What is claimed is:

1. A smart phone comprising:
   a rear cover;
   a rear case bonded to the rear cover;
   a fingerprint recognition sensor module disposed between the rear cover and the rear case and mounted to be exposed through at least a portion of the rear cover to enable an optical operation of the fingerprint recognition sensor module;
   a decorating member which surrounds at least part of the fingerprint recognition sensor module, wherein at least part of the decorating member is exposed to an exterior of the smart phone; and
   a waterproof structure disposed between the rear cover and the decorating member,
   wherein the waterproof structure comprises:
   a first structure extending in a horizontal direction outward from a part of the decorating member and surrounding a periphery of the fingerprint recognition sensor module, wherein the first structure and the part of the decorating member are integrally molded; and
   a sealing member including elastic material and disposed on the first structure and contacting with a surface of the rear cover facing a first direction,
   wherein when the rear cover is assembled in the smart phone the sealing member between the first structure and the rear cover is compressed by the rear cover to seal a gap between the first structure and the rear cover for preventing moisture from penetrating into the smart phone through the gap.

2. The smart phone of claim 1, wherein the first structure extends along a perimeter of the fingerprint recognition sensor module.

3. The smart phone of claim 1, wherein the sealing member comprises a body attached on the first structure, and the sealing member comprises first and second sealing portions extending from the body, compressed by the rear cover, and spaced apart from each other.

4. The smart phone of claim 3, wherein a cross-section of the first and second sealing portions is a "V" shape.

5. The smart phone of claim 3, wherein the first and second sealing portions provide two sealing points.

6. The smart phone of claim 1, wherein one part of the sealing member is attached to one side of the first structure by a waterproof tape.

7. The smart phone of claim 1, wherein the at least part of the decorating member serves as at least part of an exterior surface of the rear cover.

8. The smart phone of claim 1, wherein fingerprint recognition sensor module comprises a structure and the decorating member comprises a structure, wherein the structure of the fingerprint recognition sensor module and the structure of the decorating member are perpendicular to each other and extend along the periphery of the fingerprint recognition sensor module.

9. The smart phone of claim 8, wherein the structure of the fingerprint recognition sensor module and the structure of the decorating member are made of a metal material, and are integrally molded.

10. The smart phone of claim 1, wherein an adhesive layer is further disposed in a space between the fingerprint recognition sensor module and a structure of the decorating member to prevent moisture from penetrating into the smart phone through the space between the fingerprint recognition sensor module and the decorating member.

* * * * *